United States Patent [19]

Lysohir et al.

[11] Patent Number: 5,123,199
[45] Date of Patent: Jun. 23, 1992

[54] FISH HOOK GUARD

[76] Inventors: Alexander Lysohir, 6122 Oldham Ct., South Bend, Ind. 46614; Daniel A. Lysohir, 1471 Periwinkle Way, Sanibel Island, Fla. 33957

[21] Appl. No.: 632,337

[22] Filed: Dec. 21, 1990

[51] Int. Cl.$^5$ .................... A01K 97/06; A01K 87/00
[52] U.S. Cl. ........................................ 43/57.1; 43/25.2
[58] Field of Search ............ 43/57.1, 54.1, 25.2, 43/43.11, 43.1

[56] References Cited

U.S. PATENT DOCUMENTS

| | | |
|---|---|---|
| D. 167,803 | 9/1952 | Miller . |
| 2,165,708 | 7/1939 | Jend . |
| 2,204,185 | 6/1940 | Lougheed . |
| 2,616,209 | 11/1952 | Ploen . |
| 2,703,467 | 3/1955 | Shepherd . |
| 2,775,060 | 12/1956 | Barker . |
| 2,932,118 | 4/1960 | Jend . |
| 3,141,258 | 7/1964 | Mayer ................................ 43/25.2 |
| 3,331,152 | 7/1967 | Starrett . |
| 3,645,419 | 2/1972 | Shorrocck . |
| 4,015,361 | 4/1977 | O'Reilly et al. .................... 43/57.1 |
| 4,452,003 | 6/1984 | Deutsch et al. .................... 43/57.1 |
| 4,614,054 | 9/1986 | Forenyessy . |
| 4,667,433 | 5/1987 | Thompson, Jr. .................... 43/57.1 |
| 4,681,220 | 7/1987 | Beneke ................................ 43/57.1 |
| 4,757,637 | 7/1988 | Christensen ........................ 43/57.1 |
| 4,833,814 | 5/1989 | Zygutis . |
| 4,884,357 | 12/1989 | Clifford ............................... 43/25.2 |

Primary Examiner—Kurt Rowan
Assistant Examiner—Chuck Y. Mah
Attorney, Agent, or Firm—Barnes & Thornburg

[57] ABSTRACT

An enclosure which encloses and shields the sharp barb portion of a fish hook. In some preferred embodiments, the enclosure consists of a base portion with a radially extending slot which extends from the outer edge of the base portion to a location immediately past a center point in the base portion and a corresponding cover portion which has openings to permit drainage of moisture from the fish hook guard. Base portion and cover portion are preferably pivotably connected and either the base portion or the cover portion includes at least one vertically extending projection which assists in orientating the fish hook within the fish hook guard. In other preferred embodiments, a base portion positions a fish hook having a single sharp barb. The base portion is preferably pivotably connected to a cover portion which covers and encloses the sharp barb of the fish hook. Both the base portion and the cover portion preferably include openings which permit drainage of moisture from the fish hook guard. In yet other preferred embodiments, the fish hook guard consists of an enclosure which includes at one end an opening which corresponds to the fish hook and a channel extending from the opening. At the end of the enclosure opposite to the opening, a web extends radially at least as far as the channel to provide the user with a convenience and accessible surface to grip the fish hook guard without compression of the channel.

16 Claims, 3 Drawing Sheets

FISH HOOK GUARD

BACKGROUND AND SUMMARY OF THE INVENTION

The present invention relates generally to new and novel guards for fish hooks or similar articles. More particularly, the present invention relates to guards which are capable of being readily mounted to fish hooks or similar articles and which when so mounted surround and shield the fish hooks from inadvertent contact.

The potential danger from an unguarded fish hook or similar article is well recognized. When fishing from a boat, or off-shore, fishermen often leave their tackle boxes open to permit access to lures, sinkers, leaders, bait or other equipment needed while fishing. In many cases, there are two or more fishermen together in a boat who assist each other in relatively cramped quarters. For example, one fisherman can assist another in netting a fish and bringing the fish into the boat. Once a fish is successfully brought into the boat, it often flops around, sometimes knocking the contents of the tackle boxes around the boat. At the same time, the fishermen may be reaching into their tackle boxes to get pliers, stringers or other supplies to unhook and secure the fish. Thus, the possibility of inadvertent contact with unguarded fishing hooks and other sharp objects present in the tackle boxes is readily apparent. A further danger when fishing off-shore is that children, animals and other individuals may become entangled with the contents of open tackle boxes.

Several types of guards for fishing hooks and similar articles have been used. Variations of one type of fish hook guard are shown in U.S. Pat. No. 2,703,467 to Shepherd, U.S. Pat. No. 2,204,185 to Lougheed, U.S. Pat. No. 1,255,516 to Daller, U.S. Pat. No. 3,331,152 to Starrett, U.S. Design Pat. No. Des. 167,803 to Miller, U.S. Pat. No. 4,614,054 to Fovenyessy, U.S. Pat. No. 2,932,118 to Jend, and U.S. Pat. No. 2,775,060 to Barker. With this type of fish hook guard, the fish hook is generally dropped vertically into a channel having side walls of a sufficient height to shield the fish hook from inadvertent contact. One drawback to this type of fish hook guard is that the width of the channel is often not sufficiently tight for the fish hook guard to remain secured to the fish hook. In such cases, the fish hook guard can drop off of or be easily disengaged from the fish hook, thus presenting a safety hazard. Several of the prior art fish hook guards of this type have utilized extending projections such as dimples within the channel to more securely retain the fish hook within the channel. While such projections make the fish hook guard less prone to drop off, or disengage from the fish hook, they present another hazard. In order to remove the fish hook guard from the fish hook, it is necessary to grasp both the fish hook as well as the fish hook guard and pull the two apart. Often the tendency is for the user to grasp the fish hook guard across the channel and pull out the fish hook. However, this is often unproductive since by holding the fish hook guard across the channel, the channel can collapse, thus, retaining the fish hook even move securely within the channel. The user may then attempt to hold the fish hook guard on the top surface of the channel. However, this presents a hazard in that the user's fingers are in the vicinity of the sharp barbs of the fish hook as it exits the channel through the top surface of the channel. This can cause the user's unprotected fingers to be vulnerable to penetration by the sharp barbs of the fish hook.

U.S. Pat. No. 4,833,814 to Zygutis has attempted to solve this problem by including a finger guard radially extending from the top surface of the fish hook guard. While this finger guard attempts to keep the user's fingers below and away from the top surface, it is often ineffective at achieving this goal. To remove the fish hook from the fish hook guard in such a manner it is necessary to grasp the fish hook guard below the finger guard and across the channel. This tends to collapse the channel. Since it is difficult to remove the hook from the channel while collapsed, many users have the tendency to instead grasp the outside portion of the finger guard itself, thus, again exposing the user's unprotected fingers to the top of the channel and potentially the sharp barbs of the fish hook during removal of the fish hook from the fish hook guard. Thus, the finger guard as disclosed in this reference often provides only minimal protection to the user's fingers.

U.S. Pat. No. 2,616,209 discloses a shield for fish hooks having outside ribs or ledges provided adjacent the lower end of a body. These outside ribs or ledges extend between adjacent side walls to form "a convenient grip whereby the shield may be manipulated onto and removed from the gang of hooks." Another embodiment disclosed in this patent includes a series of ledges on the lower end of the body between the walls so that the shield may be gripped for manipulating it onto and off a gang of hooks. However, since the outside ribs or ledges disclosed in this patent extend only for a limited radial distance, they are often ineffective in precluding the user's fingers from gripping the shield across the channel enclosing the fish hook. Thus, the user may still collapse the channel enclosing the fish hook and preclude removal of the fish hook from the shield. This can cause the user to grip the shield on the top surface of the channel, rather than on the outside ribs or ledges, thus potentially exposing the user's unprotected fingers to the sharp barbs of the fish hook as it exits the channel through the top surface of the channel.

A second type of fish hook guard utilizes a pad into which the sharp barbs of the fish hook are embedded or, alternatively, openings which shield the sharp barbs of the fish hook, and a centrally located opening through which the shank of the fish hook passes. Variations of this type of fish hook guard are shown in U.S. Pat. No. 4,121,368 to Norwood, U.S. Pat. No. 2,482,881 to Sonner, Jr., U.S. Pat. No. 2,771,704 to Biggs, U.S. Pat. No. 3,363,357 to Sokol, U.S. Pat. No. 2,685,756 to Mowbray, U.S. Pat. No. 3,722,128 to Tremblay, U.S. Pat. No. 2,812,611 to Messick, U.S. Pat. No. 2,095,048 to Aikins and U.S. Pat. No. 2,165,708 to Jend. With this type of fish hook guard, if the sharp barbs of the fish hook are not securely embedded into the pad, the fish hook guard is generally free to slide up and down on the fish hook shank. This can expose the sharp barbs of the fish hook and creates a potential for injury to the user or permits the fish hook to become entangled with other fish hooks or equipment present in the fisherman's tackle box. On the other hand, if the sharp barbs of the fish hook are securely embedded into the pad, the fish hook can be difficult to pull out of the pad. Thus, the user can again become injured if the user's fingers are in the path of the sharp barbs of the fish hook while pulling the fish hook from the pad.

U.S. Pat. No. 2,711,611 to Miner shows a fish hook guard where an annular band of resilient material is stretched over the fish hook. Such a fish hook guard must be specifically dimensioned for each particular size of hook. If the fish hook guard is too small, it will be difficult to properly install on the fish hook. On the other hand, if the fish hook guard is too large, it will not properly retain the fish hook, and may fall off the fish hook.

U.S. Pat. No. 2,743,547 to Horst shows a fish hook guard which consists of a centrally positioned helical spring mounted within a cup-shaped housing. To install the fish hook into the fish hook guard, one must position the fish hook at the top helical coil of the spring and rotate the fish hook guard in relation to the fish hook to progressively engage the fish hook within the helical coils of the spring. Rotation in the opposite direction will disengage the fish hook from the fish hook guard. Such rotations of the fish hook guard in relation to the fish hook takes time and effort. Also, the fish hook guard can inadvertently rotate and become disengaged from the fish hook.

U.S. Pat. No. 2,185,507 to Knapp shows a fish hook guard with a plurality of arms which correspond to the number of sharp barbs in the fish hook. These arms extend radially outward from a central portion. Each arm includes an elongated slot which permits the sharp barb of the fish hook to extend through the elongated slot and positions the sharp barb inward of the arm. While such an arrangement does provide some protection from the sharp barbs of the fish hook, the sharp barbs remain exposed and, thus, can still cause potential injury to the user or become entangled with other equipment in a fisherman's tackle box.

U.S. Pat. No. 3,670,445 shows a fish hook guard which consists of a short length of tubing which has an internal diameter slightly less than the maximum cross sectional dimension of the fish hook at the point of the sharp barb. While such a fish hook guard does provide some protection, the problem of the fishing hook becoming entangled with other equipment in the fisherman's hook becoming entangled with other equipment in the fisherman's tackle box is still present. Also, three such fish hook guards are necessary to cover the three separate sharp barbs in a treble fish hook. Further, the small size of the fish hook guard can cause the fish hook guards to be easily lost or mixed in with other equipment in the fisherman's tackle box when not in use.

U.S. Pat. No. 3,645,419 to Shorrock shows a combination fish hook guard and float. The fish hook guard and float consists of two pivotably connected semispherical hollow parts which enclose and completely surround the fish hook. Because the fish hook is completely enclosed, such a fish hook guard and float cannot be used on a fish hook which is attached to a lure. Also, it is sometimes desirable for a fisherman to rinse and dry fish hooks after they have been used. For example, after fishing in salt water, it is often advantageous to rinse the lures and fish hooks used to remove salt and other chemicals which, if left on the fish hooks, could corrode and degrade the fish hooks. However, the semispherical hollow parts in this combination fish hook guard and float have only one small opening through which a fishing line can pass. Thus, it would be necessary to first remove the fish hook from the combination fish hook guard and float to permit rinsing of the fish hook. Further, moisture which does enter into the interior of the fish hook guard and float is not readily drained, potentially resulting in corrosion and degradation of the fish hook secured within the fish hook guard and float.

Accordingly, an object of the present invention is the provision of a fish hook guard which will readily accommodate fish hooks of various sizes.

Another object of the present invention is to provide a fish hook guard which permits drainage of moisture present within the interior of the fish hook guard.

A further object of the present invention is to provide a fish hook guard which allows the fish hook to be rinsed to remove salt and other chemicals present on the fish hook without necessitating removal of the fish hook from the fish hook guard.

A still further object of the present invention is to provide a fish hook guard which completely surrounds the sharp barbs of a fish hook to minimize the risk of inadvertent injury to the user and entanglement of the fish hook with other equipment in a fisherman's tackle box.

Still another object of the present invention is to provide a fish hook guard which can be readily used on fish hooks attached to a lure or other object.

Yet another object of the present invention is to provide a fish hook guard which is readily removable from a fish hook and does not require pulling or jerking to remove the fish hook guard from the fish hook.

Yet still another object of the present invention is to provide a fish hook guard which is economical to produce, durable in construction, and capable of being quickly and easily installed on and removed form a fish hook by an individual user.

These and other objects of the present invention are attained by the provision of an enclosure fabricated from a plastic material which encloses and shields the sharp barb portion of a fish hook. In some preferred embodiments, the enclosure consists of a generally circular flat base portion with a radially extending slot which extends from one edge of the base portion to a location immediately past a center point in the base portion and a corresponding cover portion which has multiple openings to permit drainage of moisture from the interior of the fish hook guard. Base portion and cover portion are preferably pivotably connected to permit the insertion and removal of the fish hook from the fish hook guard. Preferably, either the cover portion or the base portion includes at least one vertically extending projection which assists in providing rotational orientation of the fish hook within the fish hook guard.

In other preferred embodiments, the fish hook guard consists of a base portion having a radius support member which positions a fish hook having a single sharp barb within the base portion. The base portion is preferably pivotably connected to a cover portion which covers and encloses the sharp barb of the fish hook. Both the base portion and the cover portion preferably include multiple openings which permit drainage of moisture from the interior of the fish hook guard In yet other preferred embodiments, the fish hook guard consists of an enclosure which includes at one end an opening which corresponds to the radius portions of the fish hook and a channel extending from the opening. The channel preferably includes at least one inwardly extending projection which assists in retaining the fish hook within the channel. At the end of the enclosure opposite to the opening, a web extends radially at least as far as the channel to provide the user with a convenient and accessible surface to grip the fish hook guard without compression of the channel during removal of the fish hook from the fish hook guard.

Other objects, advantages and novel features of the present invention will become apparent from the following detailed description of the invention when considered in conjunction with the accompanying drawings

DETAILED DESCRIPTION OF THE DRAWINGS

Figures 1, 2, 3, 4:
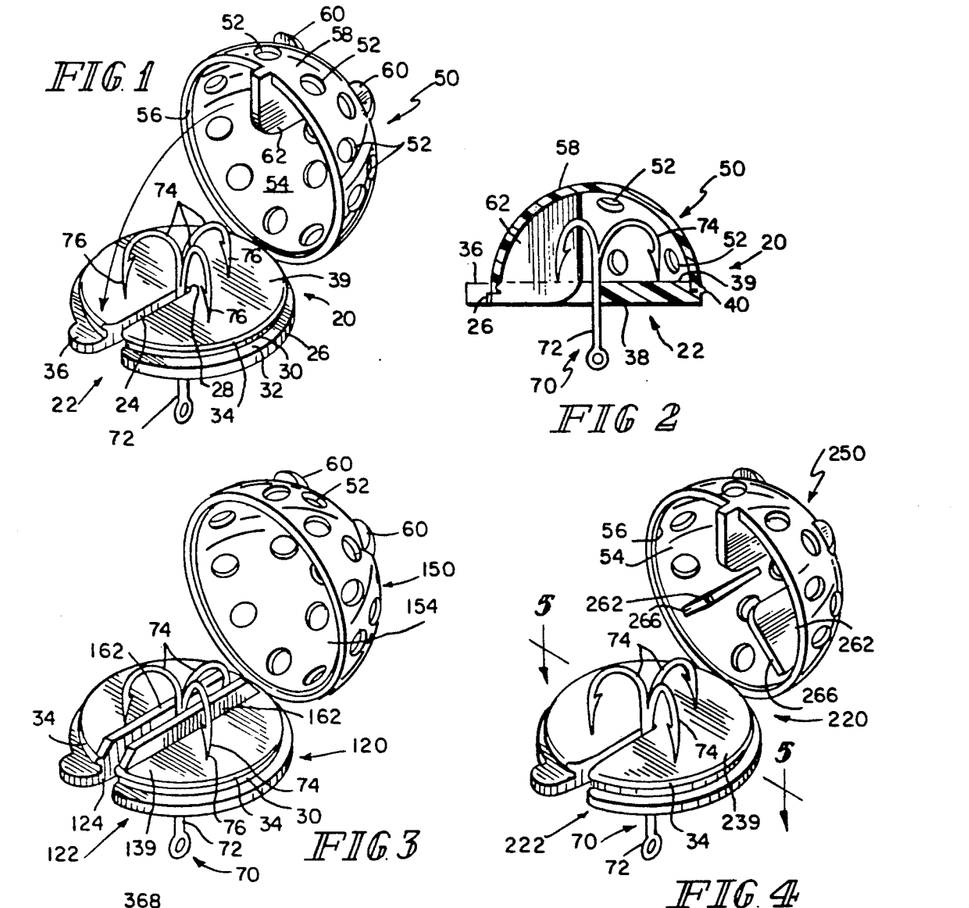
FIG. 1 is a perspective view of a preferred embodiment of a fish hook guard according to the present invention with a fish hook extending through the base portion and the cover portion opened.
FIG. 2 is a cross-sectional side view of the fish hook guard shown in FIG. 1 with the cover portion closed.
FIG. 3 is a perspective view of a second preferred embodiment of a fish hook guard according to the present invention with a fish hook extending through the base portion and the cover portion opened.
FIG. 4 is a perspective view of a third preferred embodiment of a fish hook guard according to the present invention with a fish hook extending through the base portion and the cover portion opened.

Referring now to the drawings, in which like referenced characters indicate corresponding elements throughout the several views, attention is first directed to FIGS. 1 and 2 which illustrate a preferred embodiment of a fish hook guard, identified generally by the character 20. Fish hook guard 20 includes base portion 22 which is pivotably connected by hinge 40 to cover portion 50. Fish hook guard 20 can be used with a traditional treble fish hook 70 having central longitudinally extending shank 72, radius portions 74 and three sharp barbs 76.

Base portion 22 is generally circular in configuration and includes radially extending slot 24 which extends from outer edge 26 of base portion 22 to a predetermined distance beyond center point 28 of base portion 22. The predetermined distance radially extending slot 24 extends past center point 28 of base portion 22 is preferably at least as long as half the cross-sectional dimension of longitudinally extending shank 72 of fish hook 70 so longitudinally extending shank 72 is positioned substantially at center point 28 of base portion 22. The width of radially extending slot 24 is preferably larger than the cross-sectional dimension of longitudinally extending shank 72 to permit longitudinally extending shank 72 to slide within radially extending slot 24 from outer edge 26 of base portion 22 to center point 28. Preferably, radially extending slot 24 includes a radius transition with outer edge 26 to facilitate the entry of longitudinally extending shank 72 into radially extending slot 24.

Cover portion 50 is preferably semispherical in configuration and includes a plurality of openings 52 which permit moisture enclosed within fish hook guard 20 to drain through cover portion 50. In addition, openings 52 are preferably sufficiently large to permit fish hook 70 to be rinsed to remove salt and other chemicals present on fish hook 70 without necessitating removal of fish hook 70 from fish hook guard 20. Cover portion 50 is dimensioned to fit over inner diameter 30 of base portion 22 and rest on horizontal ledge 32 of base portion 22 around the circumference of base portion 22. As seen in FIG. 1, interior surface 54 of cover portion 50 includes horizontally extending projection 56 near the bottom of cover portion 50. Horizontally extending projection 56 on cover portion 50 is dimensioned to slide over and engage with corresponding horizontally extending projection 34 extending from inner diameter 30 of base portion 22 to secure cover portion 50 in its closed position on base portion 20.

Base portion 22 and cover portion 50 are pivotally connected by hinge 40 which extends from outside edge 26 of base portion 22 to exterior surface 58 of cover portion 50. Preferably hinge 40 is positioned 180° from the intersection of radially extending slot 24 and outer edge 26 of base portion 22. In the preferred embodiment shown, grasping element 36 extends radially beyond outer edge 26 of base portion 22 and is positioned adjacent radially extending slot 24. Preferably, grasping element 36 includes a radius transition with radially extending slot 24 to facilitate the entry of longitudinally extending shank 72 into radially extending slot 24. At least one, and preferably two, grasping elements 60 extend from exterior surface 58 of cover portion 50. Thus, grasping element 36 extending from base portion 22 and grasping elements 60 extending from cover portion 50 allow cover portion 50 to be opened in relation to base portion 22.

Interior surface 54 of cover portion 50 preferably includes vertically extending projection 62. In the preferred embodiment shown, vertically extending projection 62 is slightly narrower than the width of radially extending slot 24 in base portion 22 to permit vertically extending projection 62 to enter into and slide in relation to radially extending slot 26. Also, the height of vertically extending projection 62 is such that when vertically extending projection 62 is inserted into radially extending slot 24, bottom surface 64 of vertically extending projection 62 is flush with bottom surface 38 of base portion 22. Thus, the configuration of vertically extending projection 62 is preferably such that vertically extending projection 62 substantially fills radially extending slot 24, precluding sharp barbs 76 of treble fish hook 70 from entering into radially extending slot 24 from top surface 39 of base portion 22. Radius portions 74 of treble fish hook 70 are positioned such that vertically extending projection 62 enters into the space between adjacent radius portions 74. This assists in providing rotational orientation for treble fish hook 70 within fish hook guard 20. Also, the insertion of vertically extending projection 62 into radially extending slot 24 assists in orientating base portion 22 and cover portion 50 when fish hook guard 20 is in its closed position.

To place treble fish hook 70 into fish hook guard 20, fish hook guard 20 is opened by holding base portion 22 in one hand and gripping grasping element 36 in base portion 22 with a thumb. Grasping elements 60 in cover portion 50 are then gripped with two fingers on the other hand and cover portion 50 is opened from base portion 22 by pivoting about hinge 40. Once fish hook guard 20 is opened, base portion 22 of fish hook guard 20 is held in one hand and longitudinally extending shank 72 of treble fish hook 70 is held in the other hand. Longitudinally extending shank 72 of treble fish hook 70 is then slid along radially extending slot 24 from outside edge 26 of base portion 22 to center point 28 with sharp barbs 76 of treble fish hook 70 resting on top surface 39 of base portion 22. Cover portion 50 is then pivoted about hinge 40 into its closed position in relation to base portion 22. Vertically extending projection 62 in interior surface 54 of cover portion 50 assists in providing rotational orientation for treble fish hook 70 within fish hook guard 20. Horizontally extending projection 56 positioned ne r the bottom of interior surface 54 of cover portion 50 then slides over and engages with horizontally extending projection 34 in inner diameter 30 of base portion 22 to secure cover portion 50 in its closed position in relation to base portion 22.

To remove treble fish hook 70 from fish hook guard 20, the above steps are reversed. Longitudinally extending shank 72 of treble fish hook 70 is held in one hand and cover portion 50 is pivoted opened from base portion 22 by gripping grasping elements 60 on cover portion 50 with the other hand. Longitudinally extending shank 72 of treble fish hook 70 is then slid along radially extending slot 24 from center point 28 of base portion 22 to outer edge 26 and is removed from fish hook guard 70. If desired, cover portion 50 can then be closed on base portion 22 for storage without a fish hook or, alternatively, another fish hook could be placed within fish hook guard 20.

Referring now to FIG. 3, a second preferred embodiment of a fish hook guard is shown, identified generally by the character 120. Fish hook guard 120 is preferably identical to fish hook guard 20 with the exception that vertically extending projection 62 o interior surface 54 of cover portion 50 is replaced by two vertically extending projections 162 on top surface 139 of base portion 122. Vertically extending projections 162 are positioned adjacent to and run parallel with radially extending slot 124. As seen in FIG. 3, vertically extending projections 162 are positioned such that one radius portion 74 of treble fish hook 70 is positioned between vertically extending projections 162 beyond the center point of base portion 122 and the remaining two radius portions 74 are positioned outside vertically extending projections 124 forward of the center point of base portion 122. Preferably, the height of vertically extending projections 124 is greater than the distance between interior surface 154 of cover portion 150 and radius portions 74 of treble fish hook 70 when sharp barbs 76 are positioned on top surface 139 of base portion 122 to preclude sharp barbs 76 of treble fish hook 70 from rotating over the top of vertically extending projections 124.

Figures 5, 6, 7:
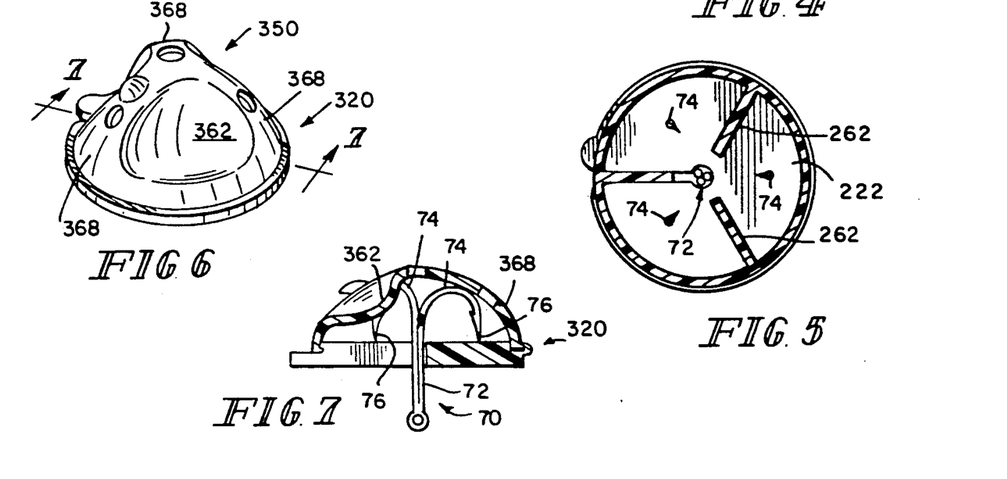
FIG. 5 is a cross-sectional view of the fish hook guard shown in FIG. 4 taken across lines 5—5 in FIG. 4.
FIG. 6 is a perspective view of a fourth preferred embodiment of a fish hook guard according to the present invention with the cover portion closed.
FIG. 7 is a cross-sectional side view of the fish hook guard shown in FIG. 6 taken across lines 7—7 in FIG. 6.

Referring now to FIGS. 4 and 5, a third preferred embodiment of a fish hook guard is shown, identified generally by the character 220. Fish hook guard 220 is preferably identical to fish hook guard 20 with the exception that two additional vertically extending projections 262 extend from the interior of cover portion 250. The two additional vertically extending projections 262 are dimensioned such that their bottom surface 266 rests upon, or slightly above, top surface 239 of base portion 222. The two additional vertically extending projections 26 assist in providing rotational orientation for treble fish hook 70 within fish hook guard 220.

Referring now to FIGS. 6 and 7, a fourth preferred embodiment of a fish hook guard is shown, identified generally by the character 320. Fish hook guard 320 is preferably identical to fish hook guard 220 with the exception that cover portion 350 is configured to assist in providing rotational orientation for treble fish hook 70 within fish hook guard 320. Cove portion 350 preferably includes three vertically extending projections 362 formed within cover portion 350. Vertically extending projections 362 ar located in substantially the same positions as vertically extending projections 262 described in the third preferred embodiment. Positioned between downwardly extending projections 362 are clearance areas 368 which are above and do not interfere with radius portions 74 of fish hook 70 when treble fish hook 70 is secured within fish hook guard 320.

Figure 8:
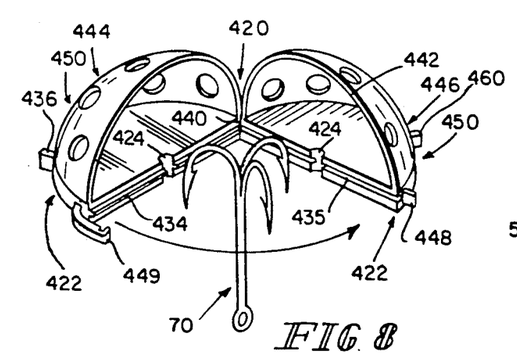
FIG. 8 is a perspective view of a fifth preferred embodiment of a fish hook guard according to the present invention with a fish hook positioned to extend through the base portion and the fish hook guard in its open position.

Referring now to FIG. 8, a fifth preferred embodiment of a fish hook guard is shown, identified generally by the character 420. Fish hook guard 420 is preferably similar to fish hook guard 20 with the exception that base portion 422 is attached to cover portion 450 and fish hook guard 420 is opened along a vertical separation plane. Therefore, rather than having hinge 40 pivot along a horizontal plane, fish hook guard 420 includes a similar hinge 440 which connects side pieces 444 and 446 and pivots along a vertical plane. First side piece 444 includes projection 448 positioned almost 180° from hinge 440 and second side piece 446 includes locking arm extension 449. Projection 448 and locking arm extension 449 are positioned adjacent to the vertical separation plane and are dimensioned such that locking arm extension 449 slides over and releasably retains projection 448 to secure first side piece 444 and second side piece 446 in their closed position. Also, radially extending slot 24 is replaced with centrally located opening 424, one-half of which is present in each of first and second side pieces 444 and 446. Longitudinally extending shank 72 of treble fish hook 70 is retained within and extends through centrally located opening 424 when treble fish hook 70 is secured in fish hook guard 420.

Preferably, a means of maintaining vertical alignment between first side piece 444 and second side piece 446 is included on the abutting base portions 422. In the preferred embodiment shown, this means of maintaining vertical alignment consists of horizontally extending projection 434 along the length of base portion 422 which corresponds to and engages with groove 435 extending along the length of base portion 422. Horizontally extending projection 434 engaging with groove 435 also helps preclude sharp barbs 76 of treble fish hook 70 from being exposed if a small gap would develop between first side piece 444 and second side piece 446. Grasping elements 436 and 460 project from base portion 422 and assist in opening and closing first side piece 444 and second side piece 446.

Figure 9:
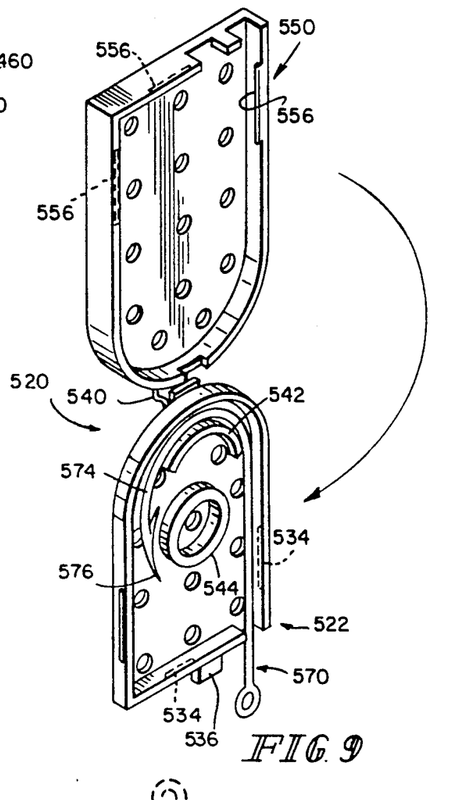
FIG. 9 is a perspective view of a sixth preferred embodiment of a fish hook guard according to the present invention with a fish hook positioned in the base portion and the cove portion opened.

Referring now to FIG. 9, a sixth preferred embodiment of a fish hook guard is shown, identified generally by the character 520. Fish hook guard 520 is designed to retain and guard fish hook 570 with a single sharp barb 576. Fish hook guard 520 consists of base portion 522 and cover portion 550 which are pivotally connected at one end by hinge 540. Base portion 522 includes radius support member 542 which positions radius portion 574 of fish hook 570, thus orientating fish hook 570 within base portion 522. Also provided is spacer ring 544 centrally located in base portion 522 to maintain a separation distance between base portion 522 and cover portion 550. Horizontally extending projections 534 in base portion 522 are dimensioned to slide over and releasably engage with corresponding horizontally extending projections 556 in cover portion 550. Thus, base portion 522 is releasably secured to cover portion 550 when fishing hook 570 is positioned in base portion 522.

To install fish hook 570 in fish hook guard 520, cover portion 550 is held along its outer edges in one hand and grasping element 536 extending from base portion 522 is gripped by the other hand. Base portion 522 is then pivoted opened from cover portion 550. Radius portion 574 of fish hook 570 is positioned against radius support member 542 in base portion 522. Once so positioned, cover portion 550 is pivoted closed onto base portion 522 and fish hook guard 520 is secured in the closed position by horizontally extending projections 534 in base portion 522 sliding over and engaging horizontally extending projections 556 in cover portion 550.

Figure 10:
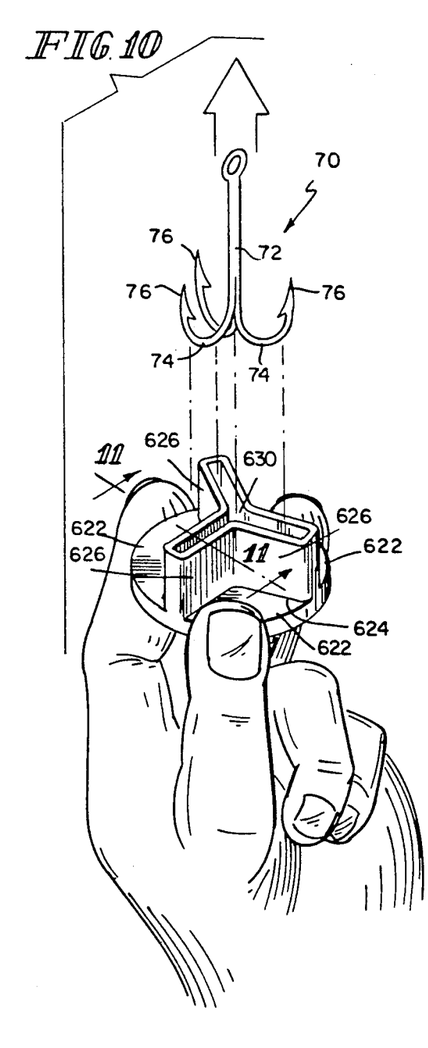
FIG. 10 is an exploded perspective view of a seventh preferred embodiment of a fish hook guard according to the present invention with a fish hook positioned for insertion into the fish hook guard.
Figure 11:
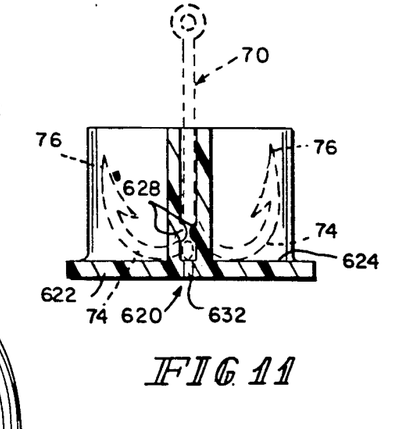
FIG. 11 is a cross-sectional side view of the fish hook guard shown in FIG. 10 taken across lines 11—11 in FIG. 10.

Referring now to FIGS. 10 and 11, a seventh preferred embodiment of a fish hook guard is shown, identified generally by the character 620. Fish hook guard 620 is similar to the finger-guarded fish hook sheath disclosed in U.S. Pat. No. 4,833,814 to Zygutis and this patent is hereby incorporated by reference. However, the finger guard present in U.S. Pat. No. 4,833,814 to Zygutis is eliminated, and finger engaging surface 622 is incorporated extending radially from lower portion 624 of fish hook guard 620 as least as far as channel 626. Thus, finger engaging surface 622 provides a convenient and accessible surface for grasping fish hook guard 620 without collapsing channel 626 during insertion or removal of treble fish hook 70. Preferably, opening 632 is provided from channel 626 to permit drainage of fluid present within channel 626.

To install fish hook 70 into fish hook guard 620, fish hook guard 620 is held by gripping finger engaging surface 622 with the fingers and thumb of one hand. Longitudinally extending shank 72 of fish hook 70 is then pushed downwardly into channels 626 past internal projections 628 extending from the interior walls of channels 626. To remove fish hook 70 from fish hook guard 620, fish hook guard 620 is gripped by the fingers and thumb on one hand at finger engaging surface 622 and longitudinally extending shank 72 of fish hook 70 is pulled upwardly to move fish hook 70 past internal projections 628 to disengage fish hook 70 from fish hook guard 620. Thus, at all time, the user's fingers are maintained at a distance below and away from opening 630 and the vertical movement of sharp barbs 76 of fish hook 70. Also, there is no need to hold fish hook guard 620 across channel 626, thus minimizing the risk of collapsing channel 626 during insertion and removal of treble fish hook 70 from fish hook guard 620.

Figure 12:
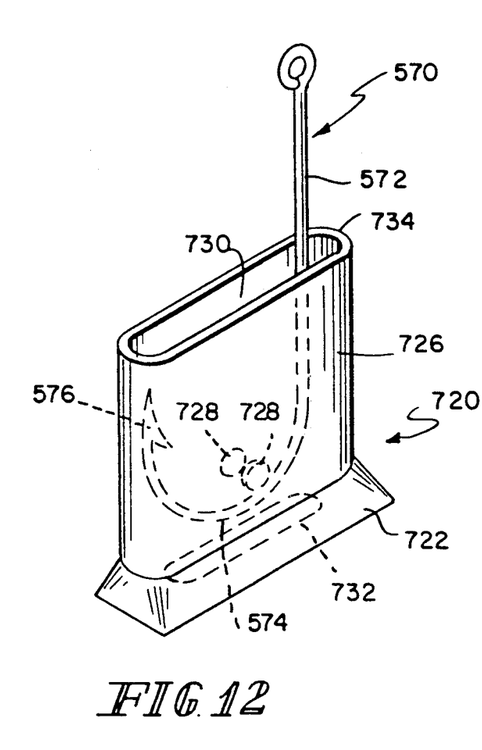
FIG. 12 is a perspective view of an eighth preferred embodiment of a fish hook guard according to the present invention with a single barb fish hook positioned within the fish hook guard.

Referring now to FIG. 12, an eighth preferred embodiment of a fish hook guard is shown, identified generally by the character 720. Fish hook guard 720 includes base portion 722 which transitions into upwardly extending walls 726. Upwardly extending walls 726 form channel 730 which is both longer and wider than radius portion 574 of single barb fish hook 570 inserted therein. Thus, single barb fish hook 570 can slide vertically within channel 730. Preferably, opening 732 is provided from channel 730 to permit drainage of fluid present within channel 730. Although in the preferred embodiment shown, drainage opening 732 extends through base portion 722, it will be recognized that drainage openings could be readily positioned in other portions of fish hook guard 720, for example through upwardly extending wall 726, or eliminated altogether.

To install single barb fish hook 570 into fish hook guard 720, fish hook guard 720 is held by gripping base portion 722 with the fingers and thumb of one hand. Longitudinally extending shank 572 of single barb fish hook 570 is then pushed downwardly into channel 730 such that radius portion 574 of single barb fish hook 570 slides between internal projections 728 extending from the interior of upwardly extending walls 726 to a position below internal projections 728. To remove single barb fish hook 57 from fish hook guard 720, fish hook guard 720 is gripped by the fingers and thumb on one hand at base portion 722. Longitudinally extending shank 572 of single barb fish hook 570 is then pulled upwardly to move radius portion 574 of single barb fish hook 570 past internal projections 728 to disengage single barb fish hook 570 from fish hook guard 720.

While it is possible to grip base portion 722 of fish hook guard 720 along either the sides or at the ends, it is often advantageous to grip base portion 722 at the ends when installing and removing single barb fish hook 570. By holding base portion 722 and the ends and squeezing, vertically extending side walls 726 will tend to billow out or separate along their length. This separation increases the distance between internal projections 728, thus facilitating the movement of radius portion 574 of single barb fish hook 570 past internal projections 728. This billowing or separation effect is enhanced by the presence of opening 732 which allows resilient deformation of base portion 722.

Figure 13:
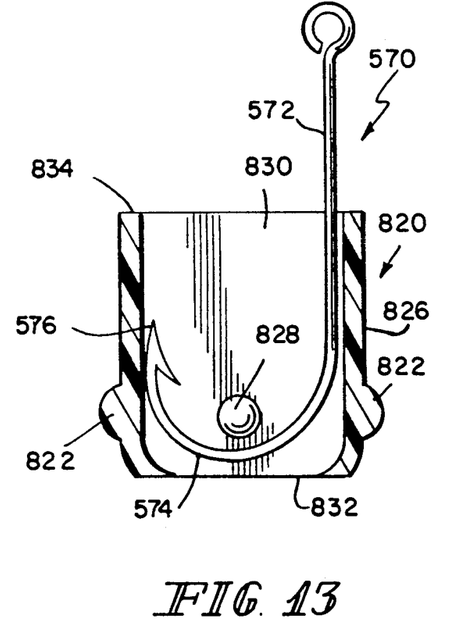
FIG. 13 is a longitudinal cross-sectional side view of a ninth preferred embodiment of a fish hook guard according to the present invention with a single barb fish hook positioned within the fish hook guard.

Referring now to FIG. 13, a ninth preferred embodiment of a fish hook guard is shown, identified generally by the character 820. Fish hook guard 820 includes upwardly extending walls 826 which form channel 830. Channel 830 is both longer and wider than radius portion 574 of single barb fish hook 570 which permits single barb fish hook 570 to vertically slide within channel 830. Two horizontally extending finger engaging elements 822 extend from the outside ends of upwardly extending walls 826 to provide a gripping surface to hold fish hook guard 820. Preferably, opening 832 is provided from channel 830 to permit drainage of fluid present within channel 830. Although in the preferred embodiment shown, drainage opening 832 is shown extending downwardly from channel 830, it will be recognized that drainage openings could be readily positioned in other portions of fish hook guard 820, for example through upwardly extending wall 726, or eliminated altogether.

To install single barb fish hook 570 into fish hook guard 820, fish hook guard 820 is held by gripping finger engaging elements 822 between the fingers and thumb of one hand. Longitudinally extending shank 572 of single barb fish hook is then pushed downwardly into channel 830 past internal projections 828 extending from the interior of upwardly extending walls 826. To remove single barb fish hook 570 from fish hook guard 820, fish hook guard 820 is gripped by the fingers and thumb on one hand at finger engaging elements 822. Longitudinally extending shank 572 of single barb fish hook 570 is then pulled upwardly to move single barb fish hook 570 past internal projections 828 to disengage single barb fish hook 570 from fish hook guard 820.

In both FIGS. 12 and 13, it is desirable for top surface 734 and 834 of vertically extending walls 726 and 826 to extend above and shield sharp barb 576 of single barb fish hook 570. At the same time, it is desirable for a portion of longitudinally extending shank 572 of single barb fish hook 570 to extend above top surface 734 and 834 of vertically extending walls 726 and 826 to permit gripping of longitudinally extending shank 572 during insertion and removal of single barb fish hook 570. With larger single barb fish hooks, the vertical distance between sharp barb 576 and the top of longitudinally extending shank 572 is sufficient to permit top surface 734 and 834 to be substantially horizontal. However, with smaller single barb fish hooks, it may be desirable for top surface 734 and 834 to extend at a downward angle towards longitudinally extending shank 572 of single barb fish hook 570. Such a downwardly angled top surface 734 and 834 exposes a greater portion of longitudinally extending shank 572 while still providing shielding for sharp barb 576.

In each of the embodiments shown, it is preferable for the fish hook guard to be fabricated from a plastic material and molded as a single integral piece. However, it should be recognized that, for example, the base portion and cover portion could be fabricated separately and attached by a subsequently assembled hinge. Also, since some lures may combine the use of single and treble hooks on a single lure, it is beneficial to have fish hook guards available which can properly accommodate and shield both types of fish hooks.

From the preceding description of the preferred embodiments, it is evident that the objects of the invention are attained by the present invention. Although this invention has been described and illustrated in detail, it is to be clearly understood that the same is by way of illustration and example only and is not to be taken by way of limitation. The spirit and scope of this invention are to be limited only by the term of the appended claims.

What is claimed is:

1. A fish hook guard for a fish hook having a shank and three barbs, said fish hook guard comprising:
    a base portion having a top surface and a radially extending slot extending from an outer diameter of said base portion to a center point of said base portion;
    said radially extending slot has a width greater than a cross-sectional diameter of said shank of said fish hook;
    said three barbs of said fish hook rest upon said top surface of said base portion when said fish hook is placed in said fish hook guard;
    a cover pivotally connected to said base portion such that initial rotation of said cover portion is substantially perpendicular to said top surface of said base portion;
    a vertically extending projection extending from an interior surface of said cover portion towards said top surface of said base portion; and
    said vertically extending projection is positioned between adjacent barbs and extends into and substantially fills at least a portion of said radially extending slot.

2. The fish hook guard of claim 1, wherein said vertically extending projection is integrally formed in said cover portion.

3. The fish hook guard of claim 1, wherein said cover portion includes means for draining moisture present within said fish hook guard.

4. The fish hook guard of claim 3, wherein said means for draining moisture present within said fish hook guard comprises a plurality of openings through said cover portion.

5. The fish hook guard of claim 1, wherein said base portion and said cover portion include means for releasably retaining said base portion and said cover portion in a closed position.

6. A fish hook guard for a fish hook having at least one barb, said fish hook guard comprising:
    an enclosure having a first end and a second end;
    said first end of said enclosure having an opening corresponding to said fish hook and a channel having side walls extending from said opening in said first end of said enclosure towards said second end of said enclosure to grasp the fish hook when inserted; and
    said second end of said enclosure includes plural outwardly extending finger engaging surfaces for gripping said second end of said enclosure without gripping said enclosure across said side walls of said channel to release the grip of the side walls when the finger engaging surfaces are pushed inwardly.

7. The fish hook guard of claim 6, wherein said finger engaging surface extends radially a distance at least as great as said channel.

8. The fish hook guard of claim 7, wherein an interior surface of said channel includes at least one projection which assists in retaining said fish hook within said channel.

9. A fish hook guard for a treble fish hook having a shank and three barbs, said fish hook guard comprising:
    a base portion having a top surface and a radially extending slot extending from an outer diameter of said base portion to a center point of said base portion;
    said radially extending slot has a width greater than a cross-sectional diameter of said shank of said treble fish hook and said three barbs rest upon said top surface of said base portion when said trebel fish hook is placed in said fish hook guard;
    a cover portion pivotably connected to said portion, said cover portion having a vertically extending projection which extends from an interior surface of said cover portion towards said top surface of said base portion, and said vertically extending projection is positioned between adjacent barbs; and said vertically extending projection extends into and substantially fills at least a portion of said radially extending slot.

10. The fish hook guard of claim 9, wherein sid cover portion includes a plurality of openings for draining moisture present within said fish hook guard.

11. The fish hook guard of claim 9, wherein said base portion and said cover portion include a first means for releasably retaining said base portion and said cover portion in a closed position.

12. The fish hook guard of claim 9, wherein said cover portion further includes a second and a third vertically extending projection each of which extend from said interior surface of said cover portion towards said top surface of said base portion, and said second and said third vertically extending projections are positioned between adjacent barbs.

13. A fish hook guard for a fish hook having at least one barb, said fish hook guard comprising:

an enclosure having a first end and a second end;

said enclosure having an opening corresponding to said fish hook and a channel having side walls extending from sid first end towards said second end to grasp the fish hook when inserted;

said enclosure having end walls extending from said first end towards said second end; and outwardly extending finger engaging surfaces on said end walls of said enclosure intermediate said first and second ends for gripping said guard without gripping said guard across said side walls of said channel.

14. The fish hook guard of claim 13 wherein said fish hook has three barbs and said guard has three channels.

15. The fish hook guard of claim 13 wherein gripping of said finger engaging surfaces applies no force to flex the walls of the enclosure.

16. The fish hook guard of claim 15 wherein said fish hook has three barbs and said guard has three channels.

* * * * *

UNITED STATES PATENT AND TRADEMARK OFFICE
CERTIFICATE OF CORRECTION

PATENT NO. : 5,123,199
DATED : June 23, 1992
INVENTOR(S) : Alexander Lysohir

It is certified that error appears in the above-identified patent and that said Letters Patent is hereby corrected as shown below:

In the Background and Summary of the Invention, column 4, line 31, please delete "form" and insert --from--.

In the Brief Description of the Drawings, column 5, line 41, please delete "cove" and insert --cover--.

In the Detailed Description of the Drawings, column 7, line 37, please delete "ne r" and insert --near--.

In the Detailed Description of the Drawings, column 7, line 59, please delete "o" and insert --on--.

In the Detailed Description of the Drawings, column 8, line 21, please delete "26" and insert --262--.

In the Detailed Description of the Drawings, column 8, line 29, please delete "cove" and insert --cover--.

In the Detailed Description of the Drawings, column 8, line 32, please delete "ar" and insert --are--.

In the Detailed Description of the Drawings, column 10, line 33, please delete "57" and insert --570--.

In the Claims, claim 1, at column 12, line 4, please insert --portion-- after "cover".

In the Claims, claim 10, at column 13, line 7, please delete "sid" and insert --said--.

UNITED STATES PATENT AND TRADEMARK OFFICE
CERTIFICATE OF CORRECTION

PATENT NO. : 5,123,199
DATED : June 23, 1992
INVENTOR(S) : Alexander Lysohir

It is certified that error appears in the above-indentified patent and that said Letters Patent is hereby corrected as shown below:

In the Claims, claim 13, at column 14, line 6, please delete "sid" and insert --said--.

Signed and Sealed this

Seventeenth Day of August, 1993

Attest:

BRUCE LEHMAN

Attesting Officer

Commissioner of Patents and Trademarks